United States Patent
Keshavdas et al.

(10) Patent No.: US 9,544,020 B2
(45) Date of Patent: Jan. 10, 2017

(54) NFC NEGOTIATED PAIRING

(71) Applicants: Cellco Partnership, Basking Ridge, NJ (US); Verizon Patent and Licensing Inc., Basking Ridge, NJ (US)

(72) Inventors: Jyothi Keshavdas, Pleasanton, CA (US); Lalit R. Kotecha, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 260 days.

(21) Appl. No.: 14/074,383

(22) Filed: Nov. 7, 2013

(65) Prior Publication Data

US 2015/0126109 A1 May 7, 2015

(51) Int. Cl.
*H04B 5/00* (2006.01)
(52) U.S. Cl.
CPC ............. *H04B 5/0031* (2013.01); *Y02B 60/50* (2013.01)
(58) Field of Classification Search
CPC .................................... H04B 5/0031

USPC ...................... 455/41.1, 41.2, 41.3; 340/10.4
See application file for complete search history.

(56) References Cited

U.S. PATENT DOCUMENTS

2013/0005246 A1* 1/2013 Waters et al. ................ 455/41.1

* cited by examiner

*Primary Examiner* — Hsin-Chun Liao

(57) ABSTRACT

A mobile device includes a transceiver for performing wireless communication, a microprocessor for operating said mobile device, a near field communications (NFC) system for performing wireless communication independent of the transceiver and at a lower amount of power than said transceiver, a contactless front end included in the NFC system for receiving or transmitting signals with an NFC capable device, and a pairing system implemented in the microprocessor for pairing one NFC capable device with another NFC capable device. The pairing system configures the mobile device to receive a tag or a device driver from one of the NFC capable devices that are to be paired with each other; and transfers the tag or a device driver obtained from the tag to the other of the NFC capable devices in order to enable interoperation between the two NFC capable devices.

11 Claims, 10 Drawing Sheets

NFC NEGOTIATED PAIRING

BACKGROUND

Mobile commerce, using mobile devices such as smart phones, tablets or the like, is rapidly expanding in popularity. Near field communication (NFC) is being used in many types of mobile devices; and NFC is being adopted for a variety of applications. While wireless phones perform wireless communication (such as voice communication) at one power level, NFC is performed at a lower power level. NFC is often used in payment applications. In order to support NFC based transaction services, a secure element (SE) may be used. The SE is implemented in the Universal Integrated Circuit Card (UICC) or the subscriber identity module (SIM) of new mobile devices.

NFC communication occurs when a mobile device with NFC capability is brought within NFC communication range of an NFC enabled terminal. An example of an NFC payment terminal is a point of sale (POS) which may be found, for example, in a brick-and-mortar store. In this example, the terminal sends out a command via a magnetic field to initiate communication with a contactless front end (CLF) which is found within an NFC controller in the NFC capable mobile device. The CLF interprets the command and routes the request appropriately. If the request is for mobile payment, the CLF routes the data to the secure element for authentication. Once the authentication requirement is met, secure information from the SE will be released through a secure channel from the SE through the NFC controller back to the POS terminal.

Many applications of the NFC controller are for the purpose of permitting secure access, either to monetary funds or to physical locations. In the example above, the NFC permits the mobile device to behave like a credit card. Other examples that use the NFC, for example, include access to a transit system and an electronic "key" in order to gain access to a locked building. Although interaction with the secure element may not be involved, NFC communication may also be used for a variety to information exchanges, for example, to allow mobile device users to share pictures from one device to another.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The examples disclosed below include methods, mobile devices and programming for such devices to enable a mobile device to support an exchange of data between two other devices to pair the other two devices, where at least one communication for the data exchange uses an NFC capability of the mobile device.

Figure 1:
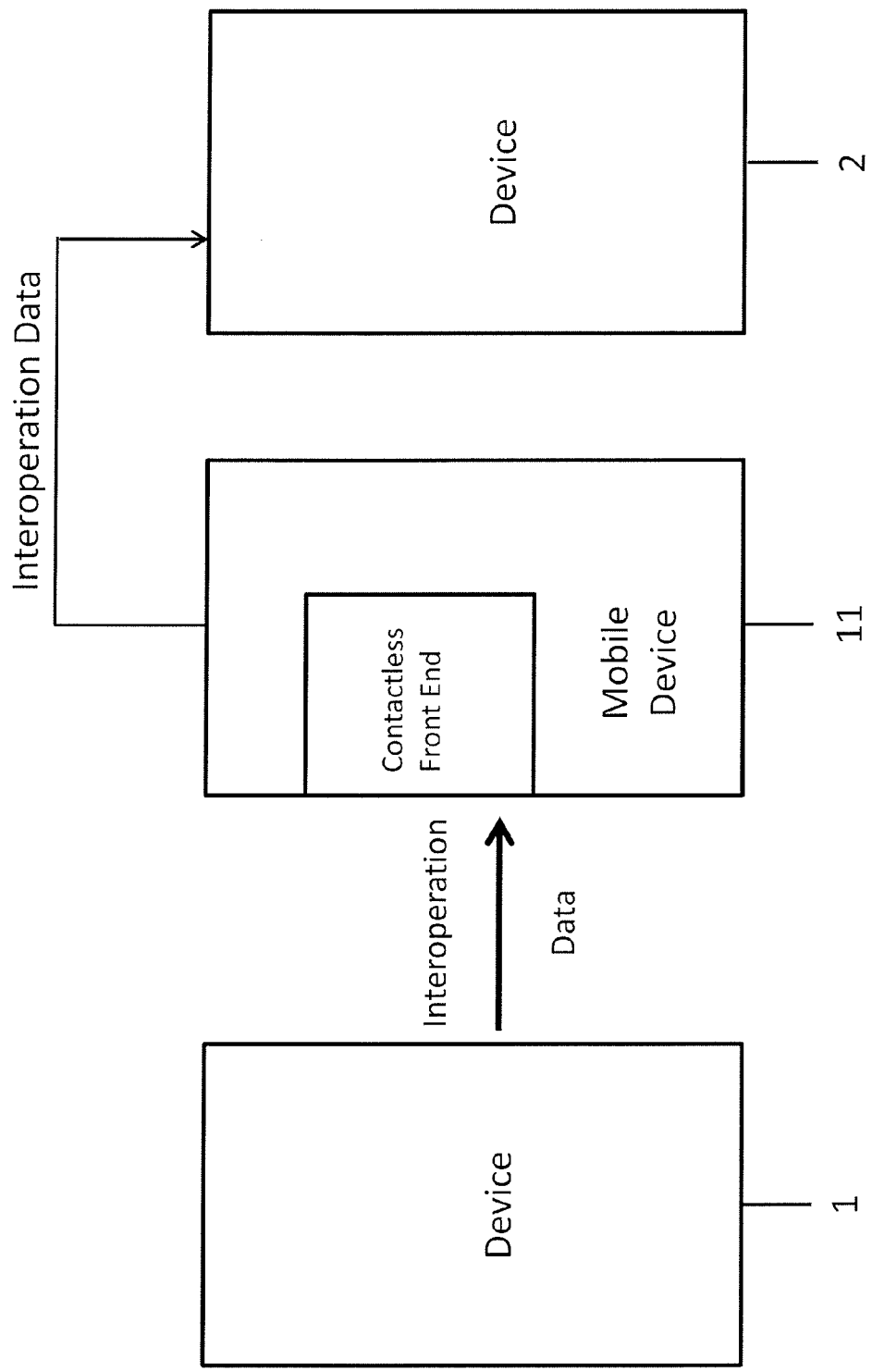
FIG. 1 is a high-level functional block diagram which illustrates how a mobile device can be used to pair together two other devices.

FIG. 1 is a high level block diagram which illustrates an example of NFC pairing. In FIG. 1, it is desired that device 1 and device 2 be paired together. By stating "paired" what is meant is that some form of communication between device 1 and device 2 is desired, which requires one or both of the devices to learn something about the other and thereby enable inter-operation of the devices. In an initial mode, device 1 and device 2 are not communicating. Some type of modification (i.e., software/firmware) must be made to device 1 and/or device 2 in order for device 1 and device 2 to communicate. In one example, device 2 needs a device driver for device 1, in order for device 2 to communicate with and possibly operate device 1. In the example shown in FIG. 1, mobile device 11 is used to pair device 1 with device 2. Details of how mobile device 11 may be used to pair device 1 and device 2 are explained in detail below.

In the example shown in FIG. 1, device 1 is an NFC capable device. Thus, device 1 and mobile device 11 are able to communicate using a CLF and a NFC wireless communication link. Communication between mobile device 11 and device 2 may be accomplished in several different ways. One method of performing communication between mobile device 11 and device 2 is using the CLF and a NFC wireless communication link. There are, however, other methods of performing communication between mobile device 11 and device 2. Other examples of how communication can be performed between mobile device 11 and device 2 include numerous communication technologies which are well know to one of ordinary skill in the art and which include cellular service, WIFI, Bluetooth, etc. as well as hardware communication links such as Universal Serial Bus (USB) or wired or optical fiber Ethernet.

FIG. 1 illustrates that Interoperation Data is transmitted from device 1 to mobile device 11 via NFC wireless transmission and the mobile device 11's CLF. Interoperation Data refers to data this is used to enable device 1 and device 2 to communicate. FIG. 1 also illustrates that Interoperation Data is transmitted from mobile device 11 to device 2. The Interoperation Data that is transmitted between device 1 and device 11 is not necessarily the same Interoperation Data that is transmitted between mobile device 11 and device 2

(although in some examples, it is possible that they are the same). Explanation is provided below as to how device 1 knows which data to send to enable device 2 to communicate. As explained below, Interoperation Data may be, for example, a device driver that enables device 1 and device 2 to communicate. As another example, where a device driver is still required for pairing devices 1 and 2, Interoperation Data may be data (sometimes referred to as a "tag") that corresponds to a device driver (i.e., that is used in some way to locate, obtain, or request the device driver used to establish the desired pairing).

In one example, the device driver that device 2 needs in order to be paired with device 1 is provided by device 1. In this example, device 1 is an NFC capable device that transmits the driver (Interoperation Data) from device 1 to the CLF of mobile device 11. Upon receipt of the driver from device 1 by mobile device 11, mobile device 11 then transmits the driver (Interoperation Data) to device 2 (which is another device). After device 2 has installed the driver, device 2 is now "paired" with device 1. Thus, device 2 is able to communicate with device 1 directly.

In a second scenario, device 1 transmits a tag to the CLF of mobile device 11. Mobile device 11 then uses this tag in order to obtain a driver so that device 2 may be paired with device 1. Mobile device 11 transmits the tag to an appropriate system which recognizes the tag and which then identifies the driver associated with that tag. Transmission of the tag to an appropriate system which recognizes and identifies the driver associated with that tag may be accomplished using numerous technologies, such as NFC, Bluetooth, WIFI, cellular service, etc. The driver is then transmitted to mobile device 11. Receipt of the driver by mobile device 11 may be accomplished using numerous technologies, which again may include NFC, Bluetooth, WIFI, and cellular service. Upon receipt of the driver, mobile device 11 is then able to transmit the driver (further Interoperation Data) to device 2 (which is another device), again using any one of several known communication technologies. After the driver is installed by device 2, device 2 is then able to communicate directly with device 1.

In yet another example, device 1 transmits a tag to the CLF of mobile device 11. Mobile device 11 then transmits the tag (Interoperation Data) to device 2 (which is another device) using any of several known technologies. Device 2 then transmits the tag to an appropriate system (again using any of several known technologies), such as a web site, which retrieves a driver that corresponds to the particular tag. The driver is then transmitted to device 2 which, after being installed, is able to communicate directly with device 1.

In the examples above, device 1 communicates with mobile device 11 using NFC and mobile device 11 communicates with device 2 using several possible forms of communication, which may or may not include NFC. It is understood, however, that in other examples, mobile device 11 communicates with device 2 using NFC and device 1 communicates with mobile device 11 using several possible forms of communication, which may or may not include NFC. Thus, in the examples described above, NFC communication can be used to transmit Interoperation Data (e.g. a tag or a device driver) between device 1 and mobile device 11, to transmit Interoperation Data (e.g. a tag or a device driver) between mobile device 11 and device 2, and/or for mobile device 11 to obtain a device driver from another source. In these examples, a website can be used to provide the device drivers to device 2. For example, the website can include a database that maps tag numbers to device drivers.

The website receives a tag number, maps the tag number to a corresponding device driver, retrieves the device driver, and transmits the device driver to device 2.

Figure 2:
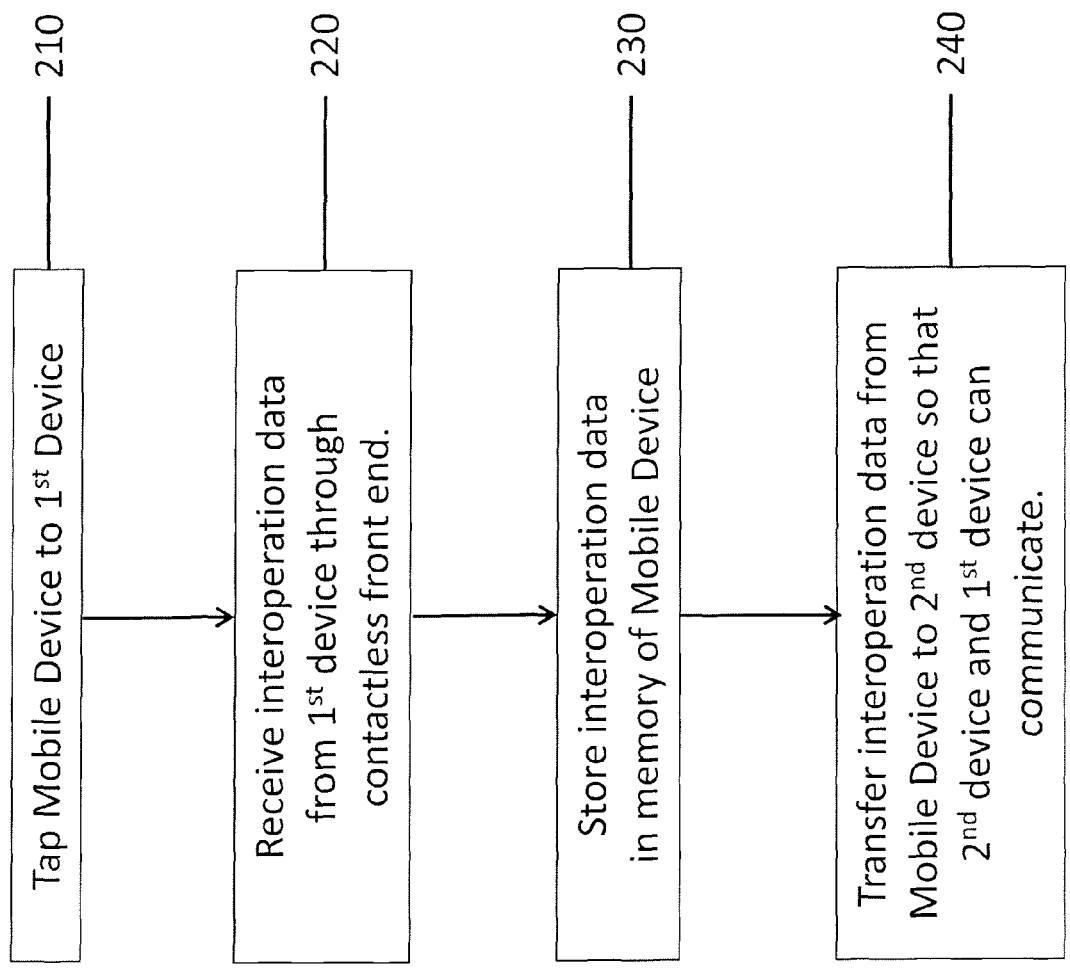
FIG. 2 is a flow chart diagram which illustrates the use of a mobile device in order to pair together two other devices.

FIG. 2 is a flowchart diagram which is useful for understanding operation of an example of a pairing technique using NFC. At step 210, a mobile device 11 can be "tapped" or placed within NFC communication proximity with device 1. At step 220, mobile device 11 receives Interoperation Data from device 1. The Interoperation Data is received from device 1 through the CLF of mobile device 11. At step 230, mobile device 11 stores the Interoperation Data that it has received from device 1 through the CLF. At step 240, the received Interoperation Data (e.g. device driver), or further Interoperation Data, (e.g. data that can be mapped to a device driver so that the device driver can be identified and downloaded to device 2) is transferred from mobile device 11 to device 2 so that device 2 and device 1 can communicate.

Figure 3:
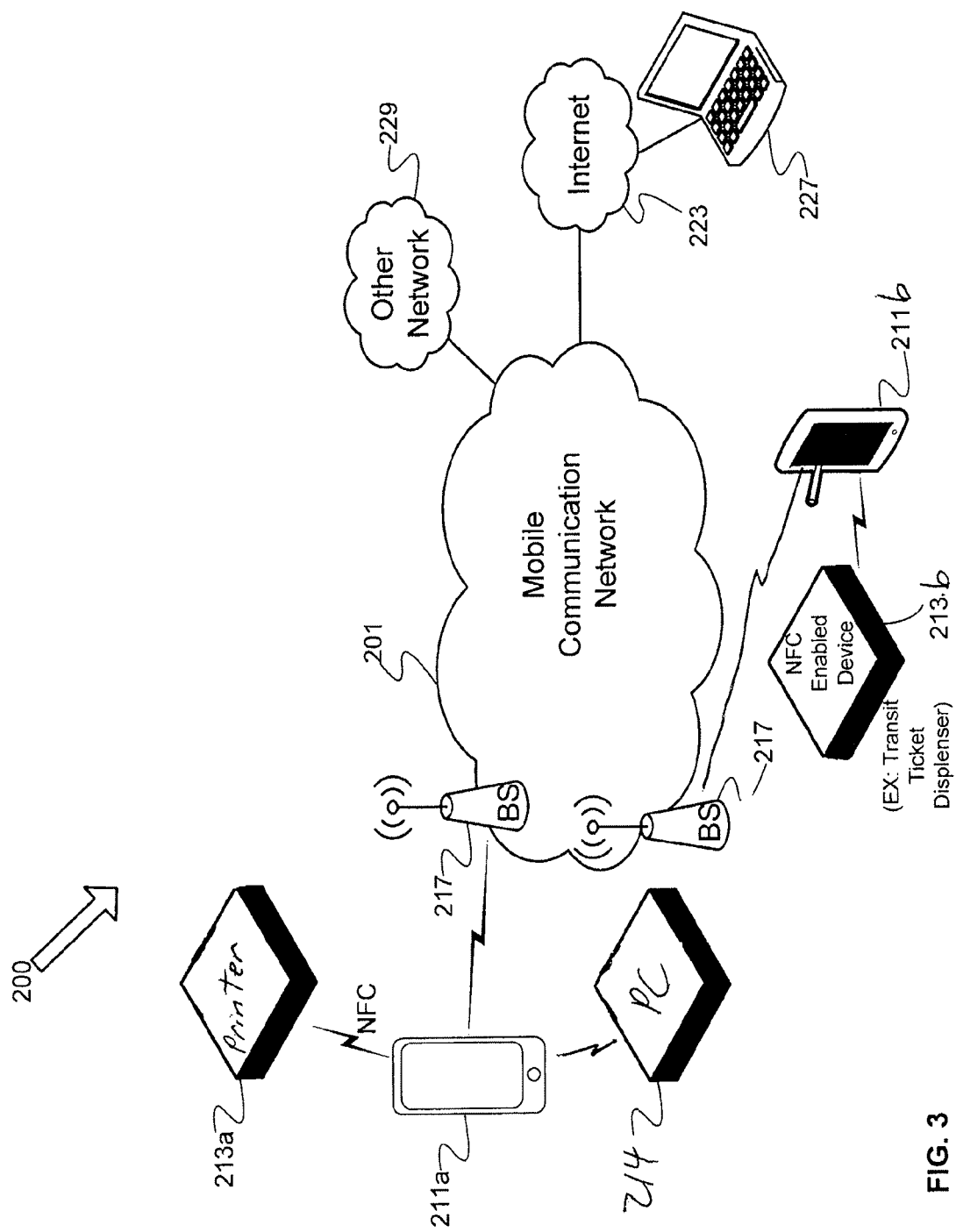
FIG. 3 is a high level functional block diagram of a system offering a frame work to provide NFC (Near Field Communication) communication between mobile devices and NFC enabled devices.

To place the NFC functions outlined above in context, it may be helpful to consider an overall system in which a number of mobile devices operate using NFC and other forms of communication. FIG. 3 illustrates a system 200 offering a framework to provide NFC communication between a mobile device (e.g., 211a, 211b) and an NFC enabled device (e.g., 213a, 213b). The example of FIG. 3 shows several mobile devices 211a, 211b (collectively referred to as mobile devices) that are examples of devices that may be used for communicating with NFC enabled devices 213a, 213b (i.e., through NFC communication) when a mobile device is in close proximity to a respective NFC enabled device. Each mobile device may have access to mobile communication network 201. NFC enabled device 213a may be, for example, a POS terminal. NFC enabled device 213b may be, for example, a transit ticket dispenser.

NFC enabled devices 213a, 213b each include an NFC system configured to communicate with NFC capable mobile devices 211a, 211b. Each NFC enabled device 213a, 213b provides wireless communication of information in accordance with NFC technology and protocols. For example, a mobile device 211a can communicate with an NFC enabled device 213a. In general, NFC enabled devices may be stationary (e.g., at an entrance as part of a keyless entry system or embedded in a smart poster), or mobile (e.g., another NFC enabled mobile device).

It may help to consider an example of a situation where the NFC based pairing via the mobile device may be advantageous. Assume a user purchases a printer 213a that includes (or is modified to include) an NFC capability. The user has a PC 214 or the like that needs to acquire a driver for the printer 213a. The user can use NFC to interact with the printer 213a, and can then communicate with the PC 214 so that the PC 214 acquires that driver that enables the PC 214 and the printer 213a to communicate.

In the example of FIG. 3, the mobile communication network 201 provides communications for mobile devices 211a and 211b as well as for mobile devices/users that do not participate in NFC-based services (e.g., regular mobile devices such as cell phones, tablet computers, etc., that do not include NFC chip sets or devices that have such chip sets but whose users do not participate in any NFC-based service). Thus, network 201 may provide regular voice and data cellular services. The network 201 provides wireless communications services to the mobile devices shown and other mobile devices (not shown), via a number of base stations (BSs) 217. The present techniques may be implemented in any of a variety of available mobile networks 201 and/or on any type of mobile device compatible with such a network 201, and the drawing shows only a very simplified example of a few relevant elements of the network 201 for purposes of discussion here.

The mobile communication network 201 may be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Long Term Evolution (LTE) standard, or other standards used for public mobile wireless communications. In one example, the mobile devices 211a and 211b are capable of voice telephone communications through the network 201, and for receiving provisioning information from the provisioning server 233. The mobile devices 211a and 211b are capable of data communications through the particular type of network 201, and the users thereof typically will have subscribed to data service through the network.

The mobile communication network 201 can be implemented by a number of interconnected networks. Hence, the overall network 201 may include a number of radio access networks (RANs), as well as regional ground networks interconnecting a number of RANs and a wide area network (WAN) interconnecting the regional ground networks to core network elements. A regional portion of the network 200, such as that serving mobile devices 211a to 211c, can include one or more RANs and a regional circuit and/or packet switched network and associated signaling network facilities.

Physical elements of a RAN operated by one of the mobile service providers or carriers include a number of base stations represented in the example by the base stations (BSs) 217. Although not separately shown, such a base station 217 can include a base transceiver system (BTS), which can communicate via an antennae system at the site of base station 217 and over the airlink with one or more of the mobile devices, when the mobile devices 211a to 211c are within range. Each base station 217 can include a BTS coupled to several antennae mounted on a radio tower within a coverage area often referred to as a "cell." The BTS is the part of the radio network that sends and receives RE signals to/from the mobile devices 211a to 211c that are served by the base station 217. The network can also include other elements that support functionality other than device-to-device media transfer services such as messaging service messages and voice communications. Specific elements of the mobile communication network 201 for carrying the voice and data traffic, and for controlling various aspects of the calls or sessions through the network 201, are omitted here for simplicity. It will be understood that the various network elements can communicate with each other, as well as other aspects of the mobile communication network 201, and other networks (e.g., the public switched telephone network (PSTN) and the Internet 223) either directly or indirectly.

The carrier may also operate a number of systems that provide ancillary functions in support of the communications services and/or application services provided through the mobile communication network 201, and those elements communicate with other nodes or elements of the mobile communication network 201, such as one or more private IP type packet data networks 229 (sometimes referred to as an Intranet), i.e., a private network. Generally, such systems are part of or connected for communication via the private network 229 of the establishment discussed herein. It will be understood that systems outside of the private network could serve the same functions as well.

Figure 4:
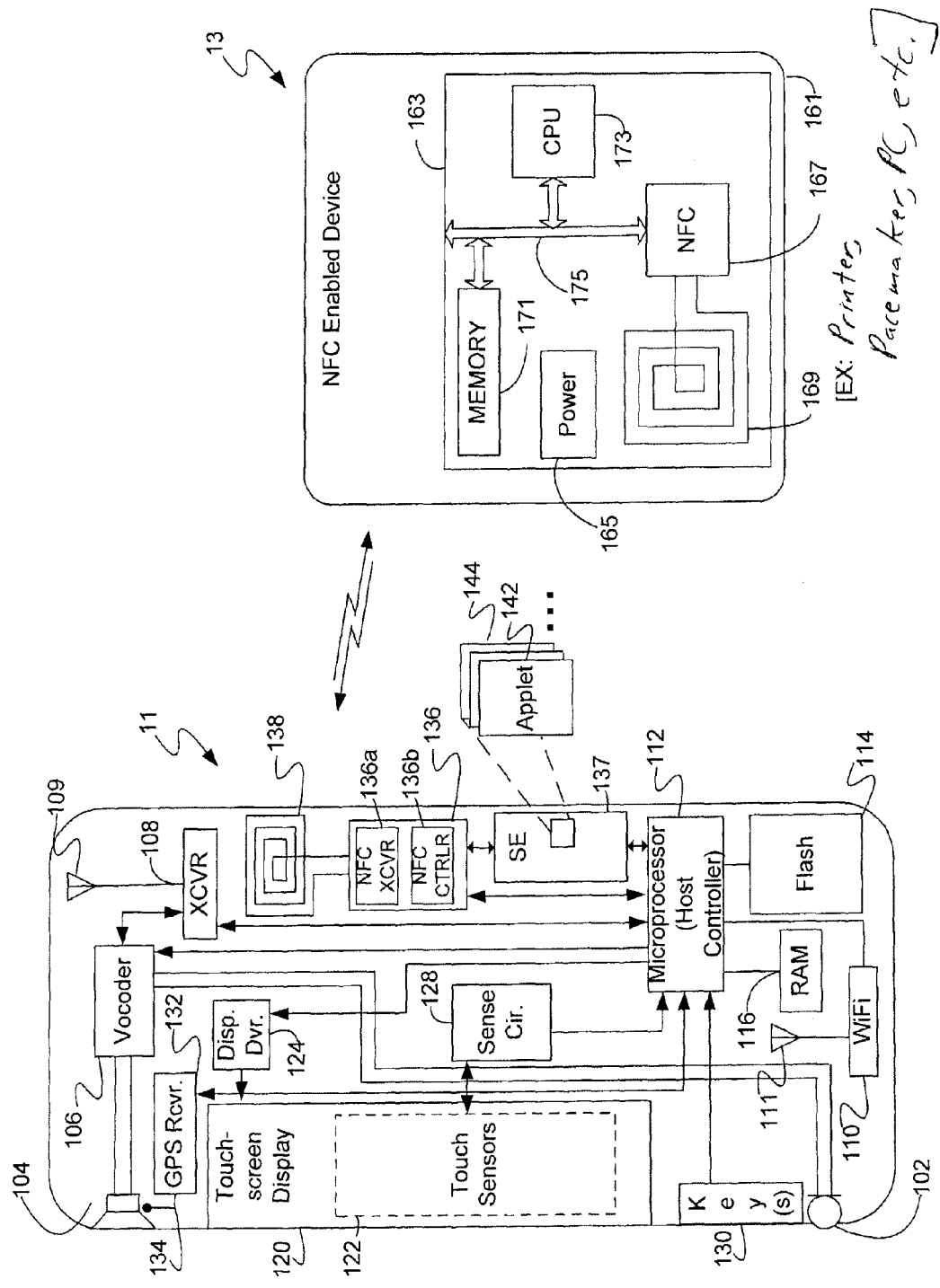
FIG. 4 is a high level functional block diagram of an exemplary mobile device and an NFC enable device.

FIG. 4 provides a somewhat more detailed illustration of elements of a mobile device 11 and an NFC enabled device 13 and depicts a relatively short range wireless communication between the mobile device 11 and an NFC enabled device 13. In the example, the mobile device 11 will use NFC communications for one or more of the communications of the mobile device 11 to assist in pairing between to other devices. For example, either one or both of the devices 1 and 2 of FIG. 2 may include NFC related components similar to those of device 13 in FIG. 4. If device 1 is an NFC enabled printer, as in one of the earlier examples, the printer could include the NFC components of device 13 described below.

Mobile device 11 includes software (a pairing system) that enables mobile device 11 to pair devices 1 and 2. The software may include a) the ability to receive a tag from device 1 and to request a device driver from any external source that corresponds to the received tag, b) the ability to transfer the tag to device 2 and signal device 2 to obtain the device driver that corresponds to the tag and to install the device driver, c) the ability to transfer the device driver to device 2 and to signal device 2 to install the device driver. The software may be stored, for example, in flash memory 114.

The drawing shows mobile device 11 by way of an example of one of the devices 211a to 211c of the environment 200 of FIG. 4; and the drawing shows NFC enabled device 13 by way of an example of one of the devices 213a and 213b. The NFC enabled device 13 represents any one of a variety of NFC enabled devices, including automatic teller machines (ATM), metro terminals, television consoles, posters, locks to contactless entry systems, and the like, which include an NFC chipset. Alternatively, the NFC enabled device 13 corresponds to device 1 (or device 2) of FIG. 1 and represents any device that is to be paired with device 2 (or device 1) of FIG. 1 (i.e. printers, display devices, medical devices, etc.). The example uses a NFC system in the mobile device 11 to communicate with the NFC enabled device 13, for example, to provide data to or receive information from the NFC enabled device 13. In an exemplary process, the following steps may take place. At a high level, the user brings the NFC enabled mobile device 11 within proximity (e.g. 2 to 4 cm or less, although in some cases the distance may be up to 20 cm) of the NFC enabled device 13. An application installed on the mobile device 11 listens for NFC events and commences a contactless data flow by establishing communication with the NFC enabled device 13.

In a card emulation mode, the NFC enabled device 13 (e.g., a point of service (POS) terminal, a subway gate, a personal computer, etc.) which corresponds to device 1 (or device 2) of FIG. 1 generates a magnetic field via its antenna 169 and initiates the transaction with the mobile device 11. The magnetic field carries the low-level protocol exchange to perform the payment transaction similar to a payment transaction between a card and a payment terminal. The terminal 13 is the initiator of the exchange and the mobile device answers to the commands sent by the terminal 13. The NFC controller 136b forwards data received from the terminal 13 to the secure element (SE) 137 for authentication. When the authentication criterion (or criteria) is met, secure information from the SE 137 is released from the SE 137 through the NFC controller 136b to the NFC enabled device 13 (POS terminal in this example).

In a second mode of operation, such as peer-to-peer (P2P), the mobile device 11 initiates a data exchange with another device (e.g., second NFC enabled mobile device). Such data exchange is defined in the ISO 18092 standard. In P2P mode, both devices (mobile device 11 and NFC enabled device 13 in this example) play a symmetric role in that both may generate a magnetic field and transmit and receive data. A typical use case for P2P communication is exchange of "business cards" between two handsets. Traditionally, such exchange is controlled by the host controller 112, without involvement of a security function, leaving the recipient of a payload potentially vulnerable to malware. However, the example uses the NFC controller 136*b* of the mobile device 11 to first determine whether a security function is required. If the security function is not required, the payload is sent to the host controller 112 for processing. However, if a security function is required, the payload from the NFC enabled device 13 is evaluated by the rule-set of the SE 137 before routing the information in the payload to the host controller 112. For example, only if the authentication criterion is met by the SE 137 does NFC controller 136*b* allow the host controller 112 to process the information from (or provide information to) the NFC enabled device 13.

In a read and/or write mode, the mobile device 11 initiates communication with an NFC enabled device 13 which corresponds to device 1 (or device 2) of FIG. 1. In this (read and/or write) mode, the mobile device 11 is used to emulate the behavior of a contactless card reader. For example, the mobile device 11 communicates with an NFC enabled device 13 (e.g., NFC enabled "smart poster") to access digital content. When a mobile device 11 is brought within range of the smart poster, the NFC controller on the mobile device 11 detects the presence of a contactless tag, generates a magnetic field, which is used to power the contactless tag. Of course, the poster may also have its own power source. The NFC enabled device 13 (smart poster in this example) may be part of a marketing campaign. The NFC enabled device 13 responds with relevant content, such as a URL, SMS text message, coupon code for a discount, etc. Traditionally, such exchange is controlled by the host controller 112, without involvement of a security function, leaving the mobile device 11 vulnerable to potential malware. For example, instead of information that pertains to the poster, the payload may lead to a malicious site or include dangerous command structures, like to "download application, install it, and periodically send location information to a server."

The read/write example uses NFC controller 136*b* of the mobile device 11 to first determine whether a security function is required. If a security function is not required, the data message is sent to the host controller 112 for processing. However, if a security function is required, the data message from the NFC enabled device 13 is evaluated by the rule-set of the SE 137. As in the P2P case, in one example, only if the authentication criterion is met by the SE 137 does NFC controller 136*b* allow the host controller 112 to process the data message (e.g., link to an URL) provided by the NFC enabled device (e.g., smart poster) 13.

FIG. 4 illustrates elements of the mobile device 11 and elements of the NFC enabled device 13 in functional block diagram form, at a relatively high level. First, we will consider the mobile device 11.

It should be appreciated that the disclosed subject matter may be implemented using any mobile computing device having NFC communication capability and mobile communication capability, configured to use those capabilities to conduct mobile transactions, e.g. for purchasing and data exchange, as discussed herein. In the example of FIG. 1, the mobile device 11 is in the form of a smart phone type mobile handset including a touch screen display 120. Examples of touch screen type mobile devices that may be used to implement mobile device 11 may include (but are not limited to) a smart phone, personal digital assistant (PDA), tablet computer or other portable device with NFC capability. However, the structure and operation of the touch screen type mobile device 11 is provided by way of example; and the subject technology as described herein is not intended to be limited thereto. For purposes of this discussion, FIG. 4 provides a block diagram illustration of the exemplary mobile device 11 having a touch screen display for displaying content and receiving user input as (or as part of) the user interface.

Although the transactions that are the focus of discussions here utilize data communications, a typical mobile device such as the exemplary smart phone 11, also supports voice communications. Hence, in the example shown in FIG. 4, the mobile device 11 includes a microphone 102 for audio signal input and a speaker 104 for audio signal output. The microphone 102 and speaker 104 are communicatively coupled to a voice or audio encoder/decoder (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (e.g., Internet Protocol) communications. The vocoder, speaker and microphone may also be used as elements of the user interface during other operations of the device, including some types of transaction communications.

Also, as shown in FIG. 4, the mobile device 11 includes at least one digital transceiver (XCVR) 108, for digital wireless communications via a wide area wireless mobile communication network, although the mobile device 11 may include additional digital or analog transceivers (not shown). The transceiver 108 conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 108 provides two-way wireless communication of information including digitized audio signals, still image and/or video signals, web page information for display as well as web related inputs, and various types of mobile message communications to/from the mobile device 11.

On-line transaction related communications involving information obtained from the NFC enabled device 13 often utilize Internet Protocol (IP) packet data transport utilizing the digital wireless transceiver (XCVR) 108 and over the air communications to and from base stations of the serving mobile network. Such communications may include specific account related data and security information from the mobile device 11, as well as payload information received from an NFC enabled device 13 during a particular transaction. Accordingly, such wireless transaction data communications may include at least some of the data obtained from the NFC enabled device 13.

In one example, the transceiver 108 also sends and receives a variety of signaling messages in support of various voice and data services provided by a network of a wireless service provider, to a user of mobile device 11 via the mobile communication network. Transceiver 108 connects through radio frequency (RF) send-and-receive amplifiers (not separately shown) to an antenna 109. Transceiver 108 may also support various types of mobile messaging services, such as short message service (SMS), enhanced messaging service (EMS), and/or multimedia messaging service (MMS). Although transaction communications involving account data obtained from the NFC enabled device 13 typically utilize IP data transport, such transaction communications may at times utilize one or more of these mobile messaging services for the data transport through the mobile communication network.

Many modern mobile devices also support wireless local area network communications over WiFi, instead of or in addition to data communications using the wide area mobile communication network. Hence, in the example of FIG. 4, for packet data communications, the exemplary mobile device 11 may also include a WiFi transceiver 110 and associated antenna 111. Although WiFi is used here as the example, the transceiver 110 may take the form of any available two-way wireless local area network transceiver of a type that is compatible with one or more standard protocols of communication implemented in wireless local area networks, such as one of the WiFi standards under IEEE 802.11 and/or WiMAX. The transceiver 110, for example, may provide two-way data transport for wireless communication with a wireless access point in a residence or enterprise that the user frequents or with any available hotspot offered in a public venue. Although communicating through a different network or networks, the transceiver 110 supports various types of data communications similar to the packet data communications supported via the mobile network transceiver 108, including communications related to transactions involving data obtained from the NFC enabled device 13.

The mobile device 11 further includes a microprocessor, sometimes referred to herein as the host processor 112, which serves as a programmable controller for mobile device 11 by configuring mobile device 11 to perform various operations, for example, in accordance with instructions or programming executable by processor 112. For example, such operations may include various general operations of the mobile device 11 as well as operations related to the communication with the NFC enabled device 13 and conducting related transactions as described herein. A flash memory 114 is used to store, for example, programming or instructions for execution by the processor 112. Depending on the type of device, the mobile device 11 stores and runs an operating system through which specific applications may be run on the device. Examples of operating systems include Android, Apple iOS (I-Phone or iPad devices), Windows Mobile, RIM BlackBerry operating system, or the like. Flash memory 114 may also be used to store mobile configuration settings for different mobile applications or services executable at mobile device 11 (using processor 112). Mobile device 11 may also include a non-volatile random access memory (RAM) 116 for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules. The instructions or programming may be used to implement the interaction with the NFC enabled device 13 and related transactions, as described herein. Program aspects of the technology may be thought of as "products" or "articles of manufacture" typically in the form of executable code or process instructions and/or associated data that is stored on or embodied in a type of machine or processor readable medium.

A mobile device supporting read/write, P2P, and card emulation and related transaction communications of the type under consideration here, may include a variety of different types of user interface elements. For discussion purposes, in the smart phone example shown in FIG. 4, the user interface elements of mobile device 11 include a touch screen display 120 (also referred to herein as "touch screen 120" or "display 120"). For output purposes, the touch screen 120 includes a display screen, such as a liquid crystal display (LCD) or the like. For input purposes, touch screen display 120 includes a plurality of touch sensors 122. Other interface elements may include a keypad including one or more keys 130. For example, the keypad may be implemented in hardware as a T9 or QWERTY keyboard of mobile device 11 and keys 130 may correspond to the physical keys of such a keyboard. Alternatively, keys 130 (and keyboard) of mobile device 11 may be implemented as "soft keys" of a virtual keyboard graphically represented in an appropriate arrangement via touch screen display 120. The soft keys presented on the touch screen display 120 may allow the user of mobile device 11 to invoke the same user interface functions as with the physical hardware keys. In some implementations, the microphone 102 and speaker 104 may be used as additional user interface elements, for audio input and output, including with respect to some functions related to the transaction processing and communication, as described herein.

For output, touch screen display 120 is used to present information (e.g., text, video, graphics or other visible content) to the user of mobile device 11. Host processor 112 controls visible display output on the LCD or other display element of the touch screen display 120 via a display driver 124, to present the various visible outputs to the device user. For example, some of the transaction related programming may cause the processor 112 to operate the driver 124 to cause screen 120 to display visible multimedia information about a product or service that the user may desire to purchase via a payment transaction using account information obtained from the NFC enabled device 13.

In general, touch screen display 120 and touch sensors 122 (and one or more keys 130, if included) are used to provide the textual and graphical user interface for the mobile device 11. In an example, touch screen display 120 provides viewable content to the user at mobile device 11. Touch screen display 120 also enables the user to interact directly with the viewable content provided in the content display area, typically by touching the surface of the screen with a finger or an implement such as a stylus.

As shown in FIG. 4, the mobile device 11 also includes a sense circuit 128 coupled to touch sensors 122 for detecting the occurrence and relative location/position of each touch with respect to a content display area of touch screen display 120. In this example, sense circuit 128 is configured to provide processor 112 with touch-position information based on user input received via touch sensors 122. In some implementations, processor 112 is configured to correlate the touch position information to specific content being displayed within the content display area on touch screen display 120. The touch-position information captured by sense circuit 128 and provided to processor 112 may include, but is not limited to, coordinates identifying the location of each detected touch with respect to the display area of touch screen display 120 and a timestamp corresponding to each detected touch position.

The user interface capabilities of the mobile device 11 provide output to and receive input from the user of the mobile device 11, for any of the various functions, operations or applications of the device. For example, programming (discussed more later) that configures the mobile device 11 to obtain and act on information from the NFC enabled device 13 and causes the mobile device to perform a security function may include further acknowledgment requests from the user. For example, the mobile device 11 may present URL information read from the NFC enabled device 13 on the display 120 during a transaction on the account and prompt the user whether they indeed would like to visit the site.

Many implementations of mobile devices today support location based services, which are quite popular now, particularly with smart phone and tablet users. Location information today may be used in a variety of services/applications. Of note for purposes of this discussion, some uses or transactions involving account or other information obtained from or provided to the NFC enabled device 13 may also involve location determination. For example, the location information of the NFC enabled device 13 may be part of the information provided to the security element 137 or to a remote server (e.g., provisioning server discussed later) to determine the authenticity of the content provided by the NFC enabled device 13. By way of just one example, at this point in our discussion, the current location of the device 13 may be recorded in memory of the device and/or communicated to a server or other equipment involved in a transaction, when the mobile device communicates over a network (e.g. to conduct a transaction) using the information obtained from the NFC enabled device 13.

There are a variety of ways that a mobile device 11 may be configured to obtain information as to current location of the device. In our example, the mobile device 11 includes a global positioning satellite (GPS) receiver 132 and associated antenna 134. GPS is a space-based satellite navigation system that provides location and time information anywhere on Earth, where there is an unobstructed line of sight to at least three, or more of the GPS satellites. In other examples, trilateration or cell site/access point identification may be used.

The mobile device 11 also has NFC communication capability. NFC may be used for a variety of different functions or applications of the mobile device 11. However, for purposes of this discussion, the mobile device 11 interacts with the NFC enabled device 13 via the NFC communication capability of the mobile device 11. NFC is a set of standards for smart phones and similar devices, such as the exemplary mobile device 11 discussed here, to establish radio communication with other such devices as well as with compatible NFC readers by coming to close proximity (e.g., 4-10 cm or less). Due to its short range and support for encryption, NFC communication is suitable for secure communication over short distances. Each NFC enabled mobile device or NFC enabled device (e.g., a smart poster, a contactless terminal such as that at a point of sale, etc.) includes a transceiver configured to communicate with other NFC capable equipment.

Hence, the exemplary mobile device 11 further includes an NFC sensor. The NFC sensor may be implemented in a variety of ways. In the exemplary mobile device 11 of FIG. 4, the NFC sensor is a contactless front end which includes an NFC type radio frequency transceiver 136a, which is formed by an NFC chipset 136. The NFC chipset 136 provides two-way wireless communication of information in accordance with NFC technology and protocols. The NFC chipset 136 includes an NFC controller 136b. The exemplary NFC sensor also includes an antenna, such as coil antenna 138. The NFC chipset 136 of device 11 connects to the NFC coil antenna 138, for transmitting and receiving NFC communications to/from other NFC compatible devices with compatible transceivers over short air link distances. The transceiver 136a formed by the NFC chipset 136 also sends and receives a variety of signaling messages for establishing NFC links with other NFC-enabled devices and sends and receives various user data over the established NFC links. The signaling, for example, may allow the transceiver formed by the NFC chipset 136 to detect proximity of another NFC capable device, establish an NFC link with the other device, trigger execution of an appropriate application within the mobile device 11 and send and/or receive data for the application as between the mobile device 11 and the other NFC capable device. Some modern mobile devices are already coming equipped with such NFC equipment, and increased NFC deployment is expected in the near future.

As discussed above, SE 137 is used to run secure applications such as payment, access to buildings, routing to an URL site, and the like. In one example, the SE 137 is separate chip that includes tamperproof storage and execution memory and is configured to communicate with an NFC controller 136b (a secure processor). The NFC controller 136b is different from the host processor 112 in that it focuses on enabling secure transactions. The SE 137 contains applications (e.g., applets) that use secure keys running inside the secure processor. For example, there may be at least one applet 142 for processing of the payment transaction; and at least one applet 144 for processing of at least one type of communication not related to a payment transaction, such as a read/write or P2P operation.

For example, the applications that run on the SE typically run on a Javacard operating system. The SE may include various account information, such as account number, user identification, a personal identification number (PIN), or the like for user verification and possibly account balance and/or transaction record information. The SE may be used to decode credentials of NFC enabled devices. In various examples, the secure element may be part of a subscriber identification module (SIM) chip or a separate secure element like a secure digital (SD) memory card used for storing and accessing applications and data in a secure manner.

Although cryptographic elements are not separately shown, the NFC chip 136 is also configured such that transmissions to the NFC enabled device 13 are encrypted. In one example, communications between the SE and the provisioning server may also be encrypted. Accordingly, the secure data storage and encrypted communication provide enhanced security and reduce the likelihood of fraud against a user's financial account.

In one example, the NFC controller 136b is configured to route all NFC traffic (e.g., data message from or sent to an NFC enabled device) through a SE 137. Put differently, the NFC controller 136b routes the NFC communication between the NFC system and the SE 137 without going to or from the host processor 112.

However, it will be understood that not all applications require the use of a security function. For example, two mobile device users may want to exchange business cards. To this end, the NFC controller 136b should have the ability to send the information directly to the host processor 112 for further execution (without the security function of the SE 137). Accordingly, in one example, when receiving information from an external NFC device, the NFC controller 136*b* is configured to initially determine whether a security function is required to process the received information. If so, the NFC controller 136*b* routes the near field communication between the NFC system and the SE 137 without going to or from the host processor 112. However, upon determining that a security function is not required, the NFC communication is routed between the NFC system and the host processor 112 without going to or from the SE 137.

The NFC controller 136*b* determines whether a security function is required in various ways (using, for example a rule set). For example, if the mode of operation is card emulation (e.g., payment), a security function is required to keep the transaction secure. Also, if the data message from the NFC enabled device 13 includes a key, a security function is required. In another example, if the payload of the data message includes a link to a Universal Resource Locator (URL), a security function is required. In another example, even if the communication may not require a security function (e.g., a simple transfer of a photo between two NFC enabled mobile devices) the user of the transferor or transferee (i.e., writing or reading) mobile device can request the transaction to be secure (e.g., by selecting "secure transfer" on the display of the mobile device). For example, the user of a mobile device can pre-configure their mobile device by selecting an option (e.g., on the user display) that requires information that is received and/or transferred to another mobile device to be secure. Alternatively, this can also be done on-the-fly (i.e., a message pops up onscreen indicating the type of transaction and other information about the transaction, indicates the default and then asks if the user wants to change). This may then be used to change the default for either a particular source or type of information. The security requirement may be with respect to all NFC communications or more focused (e.g., all mobile devices that are not on a list stored in the mobile device). Thus, a mobile device that is pre-configured to receive secure NFC communication, routes the data message received from another mobile device to the SE for evaluation. If a security key is not included in the data message, then the message is deemed not secure. To assure that the data message is processed by the transferee mobile device, the NFC controller of the transferor mobile device includes a key (provided by the SE) in the data message. To this end, the transferor mobile device may be preconfigured to send data messages via NFC in a secure manner (i.e., with a key, if available and/or alerting the transferor that the transmission needs to be secure and a key is required).

The logic implemented by the host processor 112 of the mobile device 11 configures the processor 112 to control various functions as implemented by the mobile device 11. The logic for a processor may be implemented in a variety of ways, but in our example, the processor logic is implemented by programming for execution by the microprocessor 112. Similarly, logic implemented by the NFC controller 136*b* configures the controller 136 to control various functions related to NFC communication. For example, one or more application programs are stored in the SE 137 memory for execution by the NFC controller 136*b*. Any application that is intended to utilize account related information obtained from the NFC enabled device 13 may include information stored in the SE 137 memory. For example, information in connection with a transaction with an NFC enabled device 13 is stored in the SE 137 memory, which when executed by the microprocessor 112 enables the mobile device 11 to perform transactions (e.g., purchase, ATM, unlock door, provide preferences to a TV console, etc.) with the NFC enabled device 13 using the NFC sensor formed by the NFC chipset 136 and the associated antenna 138. As disclosed above, transactions that meet one or more predetermined criteria (i.e., requiring a security function) are first routed through the SE 137.

The structure and operation of the mobile device 11, as outlined above, were described to by way of example, only.

The NFC enabled device 13 in our example includes a power supply module 165, an NFC transceiver 167 and associated coil antenna 169, and one or more memories 171. The NFC enabled device 13 may or may not include a processor serving as the central processing unit (CPU) 173 of the chip 163 and a bus system 175. For example, a CPU may not be included if the NFC enabled device 13 is used as a tag but otherwise is included if used in a P2P transaction. The NFC enabled device 13 may or may not include a battery or other internal power source. For example, instead of a power source, the power module 165 may collect energy at the time of a communication from the RF transmissions from the mobile device 11 via inductive coupling. Power may be obtained via the coil antenna 169 or another inductive coil (not separately shown) in or connected to the chip 163. The power module 165 converts the collected energy to one or more appropriate direct current (DC) voltage levels and distributes the resulting DC power to the other elements on the chip 163, as needed.

The exemplary NFC transceiver 167 connects to the coil antenna 169, for transmitting and receiving RF communications to/from the NFC enabled mobile device 11. Hence, the chipset 136 and NFC transceiver 167 are sufficiently compatible to enable the mobile device 11 to detect and communicate with an NFC enabled device 13. In one example, from the perspective of the card, the NFC enabled mobile device 11 can appear as a reader NFC enabled device. Put differently, the NFC enabled device 13 may act as a tag and the mobile device 11 may act as a reader when in read/write mode of operation.

The memory 171 of the NFC enabled device 13 stores data and/or executable programming for the CPU 173. For example, if the NFC enabled device 13 is configured as a smart poster, the memory may include URL information where the user of the mobile device 11 can obtain additional information. In one example, the memory 171 may also include a key that is used for security purposes by the SE 137 of the mobile device 11. For example, this key may be provided by a provisioning server (discussed later) during a prior provisioning process. Thus, in this smart poster example, they payload provided by the NFC enabled device 13 to the mobile device 11 includes digital payload (e.g., URL) and a key (provided by the provisioning server). The NFC controller 136*b* of the mobile device, upon determining that a security feature is required, sends the payload to the SE 137 for authentication. Upon authentication, the NFC controller routes the payload (e.g., without the key) to the host controller 112 for processing.

The bus 175 supports signaling and transfer of data and/or instructions as between various elements on the chip 163 including the CPU 173, the memory 171 and the NFC transceiver 167. The memory 171 and programming execution by the CPU 173 provide data storage.

The NFC enabled device 13 can be used in a variety of transactions/applications. Typical examples of actions using such an NFC enabled device include but are not limited to financial transactions (e.g., point of sale terminal), access control (e.g., a smart door or computing device that can be unlocked via an NFC, or TV that can be configured for user preferences), exchange of digital information (e.g., transferring and/or receiving photos between two mobile devices or serving as a smart poster), etc. By enabling the mobile device 11 to communicate with the NFC enabled device 13 in a secure manner, the uses of the NFC enabled device and the information read/obtained from the NFC enabled device can be extended to the user's mobile device 11. Using the NFC technology of the mobile device 11, one or more applications on the mobile device 11 can detect and interact with an NFC enabled device 13, to obtain and/or provide information to and/or from the NFC enabled device 13 and then use that information in a subsequent action.

The structure and operation of the NFC enabled device 13, as outlined above, has been described by way of example, only.

Figure 5:
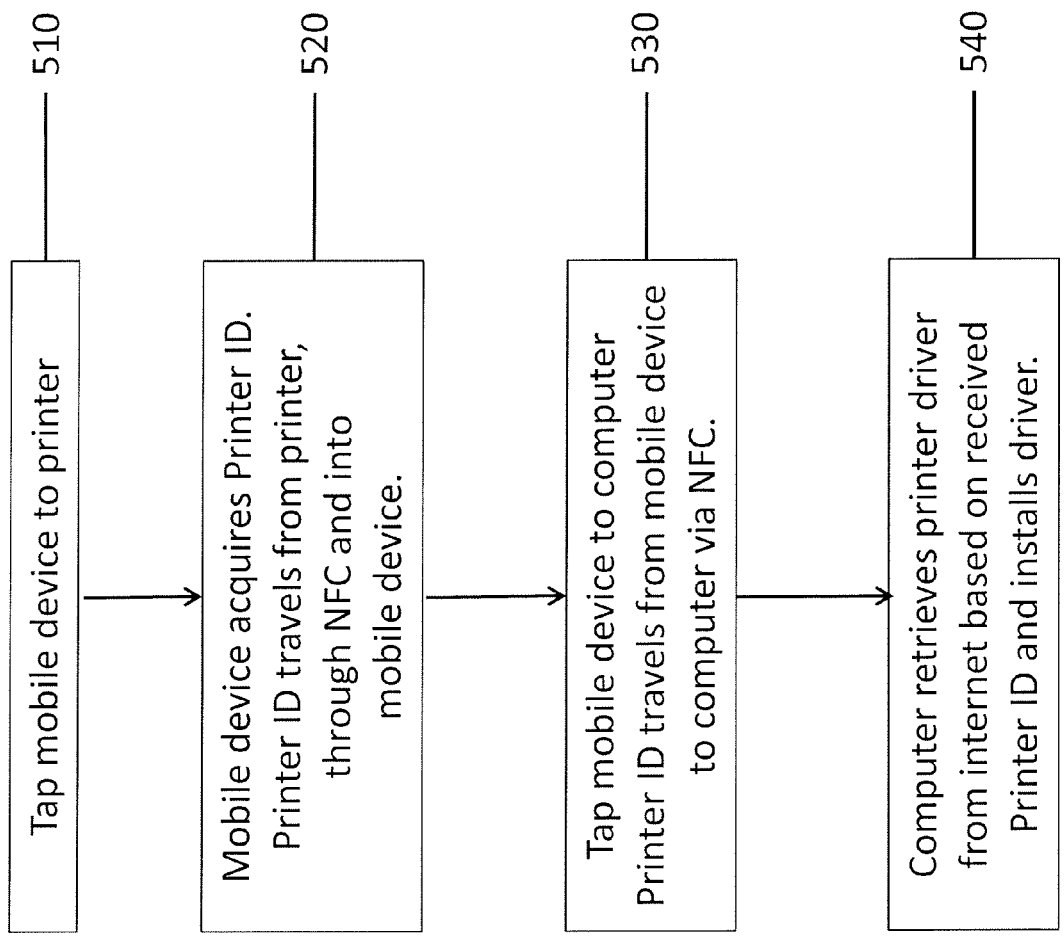
FIG. 5 is a flow chart diagram which provides details relating to how a mobile device may be used to pair together two additional devices.

FIG. 5 is a flowchart diagram which provides a further example of an NFC based pairing operation. At step 510, mobile device 11 "taps" (is placed within NFC communication proximity with) device 1. In this example, device 1 may be a printer. At step 520, mobile device 11 acquires the printer ID (the "Interoperation Data") or tag from device 1. Again, using a printer as an example, a printer ID travels from the printer, through the CLF of mobile device 11, and into mobile device 11. At step 530, the printer ID (the "Interoperation Data") travels from mobile device 11 to device 2, which in this example is a computer. Transmission of the printer ID between mobile device 11 and computer 2 is via any known technologies. At step 540, after device 2 (computer) retrieves the printer ID, device 2 may use the printer ID in order to retrieve an appropriate print driver. The appropriate print driver may be retrieved, for example, via the Internet, although other methods of enabling a computer to access a print driver are known. As explained above, IDs can be mapped to respective drivers in order to identify and download the appropriate driver. Thus, the printer ID is transmitted to a system that is able to access device drivers based on printer IDs. The service accesses the driver which corresponds to the printer ID and transmits the driver to device 2. After device 2 receives the print driver, device 2 installs the print driver and then device 2 is able to communicate directly with device 1.

Figure 6:
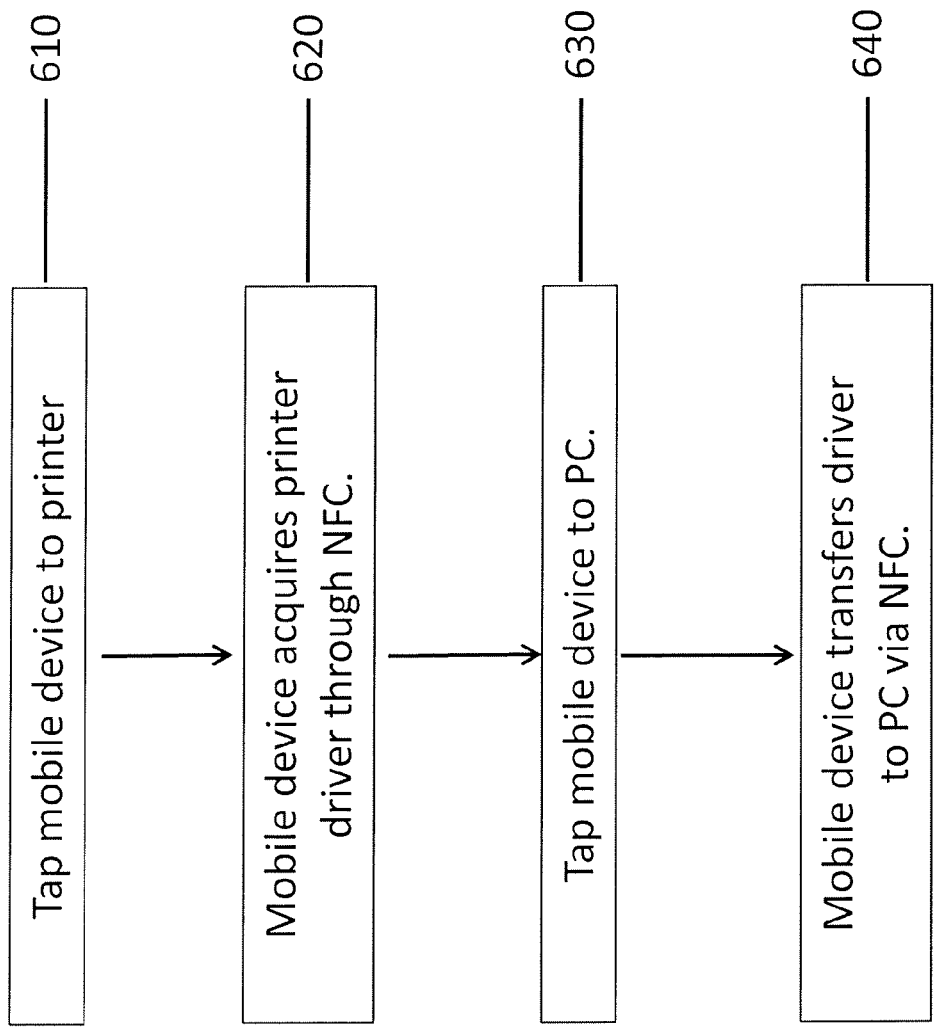
FIG. 6 is a flow chart diagram which provides another example of how a mobile device can be used to pair together two other devices.

FIG. 6 is a flow chart diagram of yet another example of NFC based pairing. At step 610, mobile device 11 is held within NFC communication proximity to device 1. In this example, the device driver (the "Interoperation Data") is received from device 1 and is transferred to device 2 via mobile device 11. At step 620, device 1 (e.g. printer) transmits the driver to mobile device 11 through the CLF of the NFC. At step 630, mobile device 11 transmits the driver (the "Interoperation Data") to device 2 (e.g. computer). At step 640, device 2 (e.g. computer) receives the driver which has been transmitted from mobile device 11, installs the driver, and is then able to communicate directly with device 1.

Figure 7:
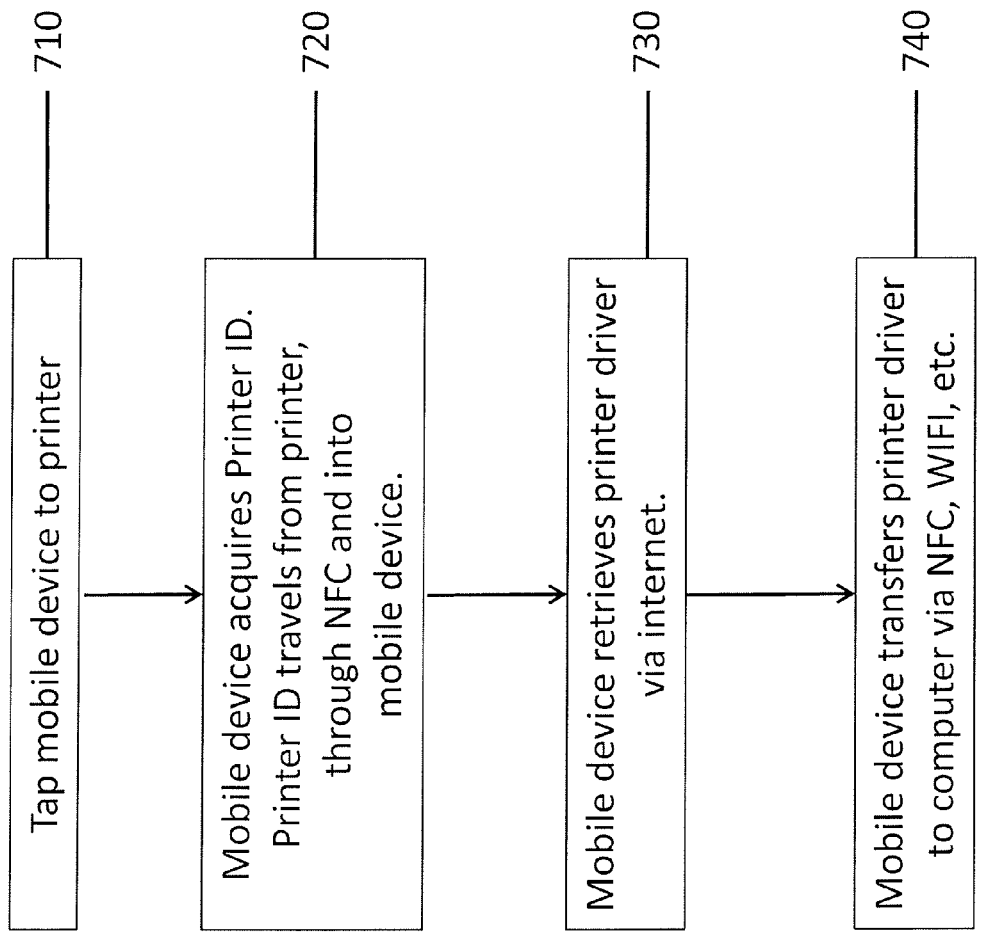
FIG. 7 is a further example of how a mobile device can be used to pair together two other devices.

FIG. 7 is yet another example of an NFC based pairing operation. At step 710, mobile device 11 is held within NFC communication proximity with device 1 (e.g. printer). At step 720, mobile device 11 acquires the printer ID (the "Interoperation Data") through the CLF of mobile device 11. The printer ID is stored in mobile device 11. At step 730, mobile device 11 retrieves the driver which corresponds to the printer ID that it has retrieved from device 1. Mobile device 11 is able to retrieve the driver in a number of ways. For example, mobile device 11 can communicate with the Internet in order to identify with a device driver which corresponds to the printer ID that it has retrieved. The device driver (the "Interoperation Data") may then be transmitted to mobile device 11. At step 740, mobile device 11 transmits the driver to device 2 (computer). The driver may be transmitted from mobile device 11 to device 2 using a variety of different technologies as described above.

Figure 8:
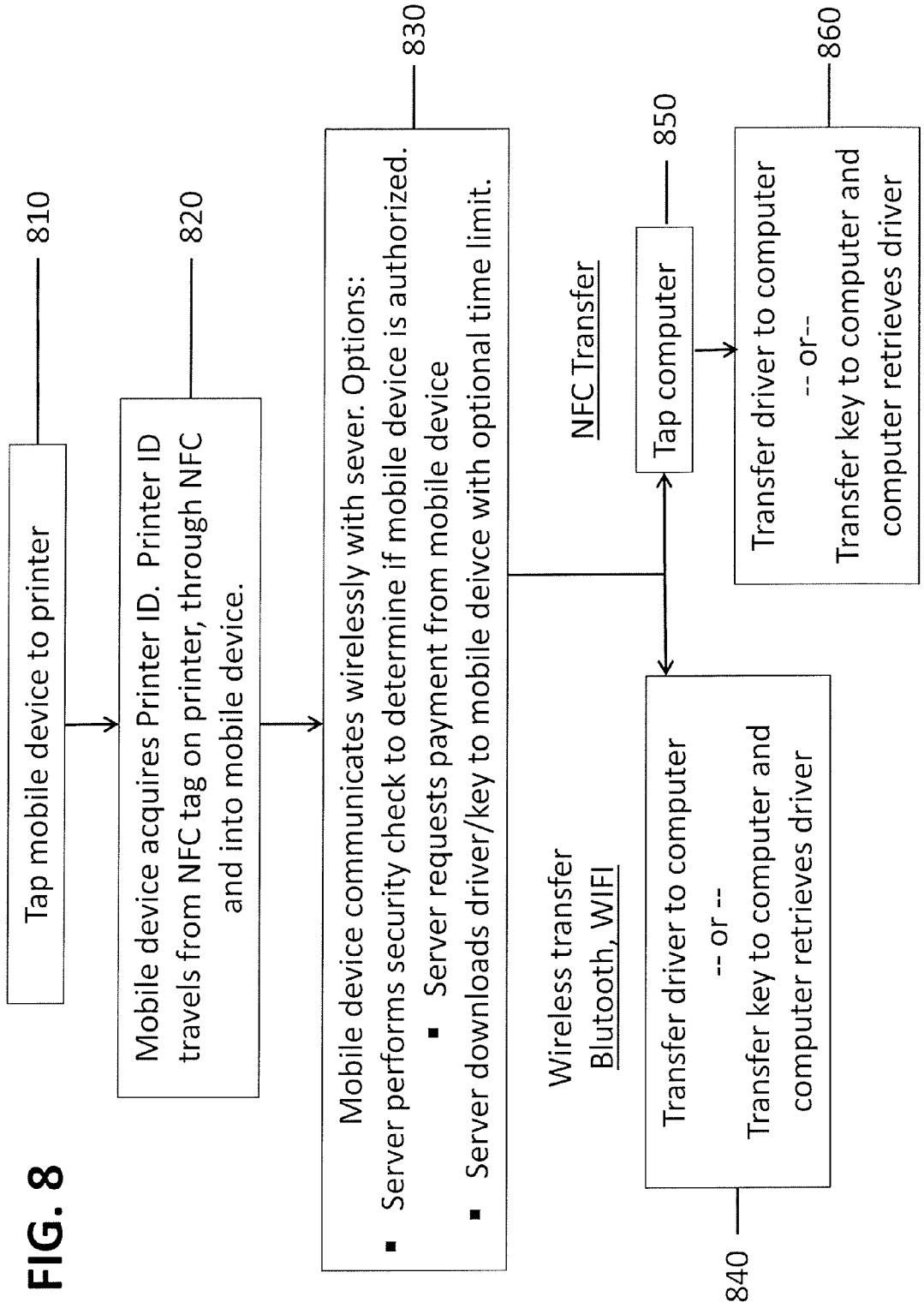
FIG. 8 is yet another example of how a mobile device can be used to pair together two other devices.

FIG. 8 shows yet another example of NFC based pairing. At step 810, mobile device 11 is placed within NFC communication proximity of device 1 (e.g. printer). At step 820, mobile device 11 acquires the printer ID (the "Interoperation Data") through an NFC tag on the printer and the printer ID is received by the CLF of mobile device 11. At step 830, mobile device 11 communicates with a server to determine whether mobile device 11 is authorized to receive a driver associated with the printer ID that it has just obtained. In one example, receipt of the printer ID is password protected, and a user of the mobile device of mobile device 11 must enter the password in order to gain access from the server. In another example, the user must pay for the driver and must enter an account or credit card information in order to purchase the driver. Thus, step 830 shows several options that may be used in combination with the example shown in FIG. 8. For example, the server performs a security check to determine if mobile device 11 is authorized to receive the driver. In a second alternative, the server requests payment from mobile device 11 and the server does not download the device driver to mobile device 11 until payment has been received (through a credit card, account, etc.). In another example, the server may download either a key or a time limit with which the driver is to be used. At step 840, if a driver (the "Interoperation Data") has been downloaded to mobile device 11, then the driver may be transferred to device 2. Alternatively, if a key (the "Interoperation Data") has been downloaded to mobile device 11, then the key is transferred to device 2 and then device 2 uses the key in order to retrieve the driver. Thus, step 840 illustrates various alternative methods that may be used with a wireless transfer such as Bluetooth or WIFI. Alternatively, at step 850, if NFC communication is being used, then at step 860 the driver or a key for device 2 to retrieve a driver is transmitted to device 2 using NFC communication.

It will be recognized that the techniques outlined in the preceding examples may be adapted to obtain various types of information for pairing of different pairs of devices 1 and 2, using the mobile device 11. Even in the examples of printer-to-computer pairing, the procedure may provide other information in addition to the printer driver. For example, the technique may be used to obtain and provide an address or other identifier that the computer can utilize to communicate with the particular printer via the applicable data communication network(s) once the devices are paired instead of or in addition to the printer driver. Some pairings may also involve providing the second device with security credentials associated with one or both of the involved devices.

Figure 9:
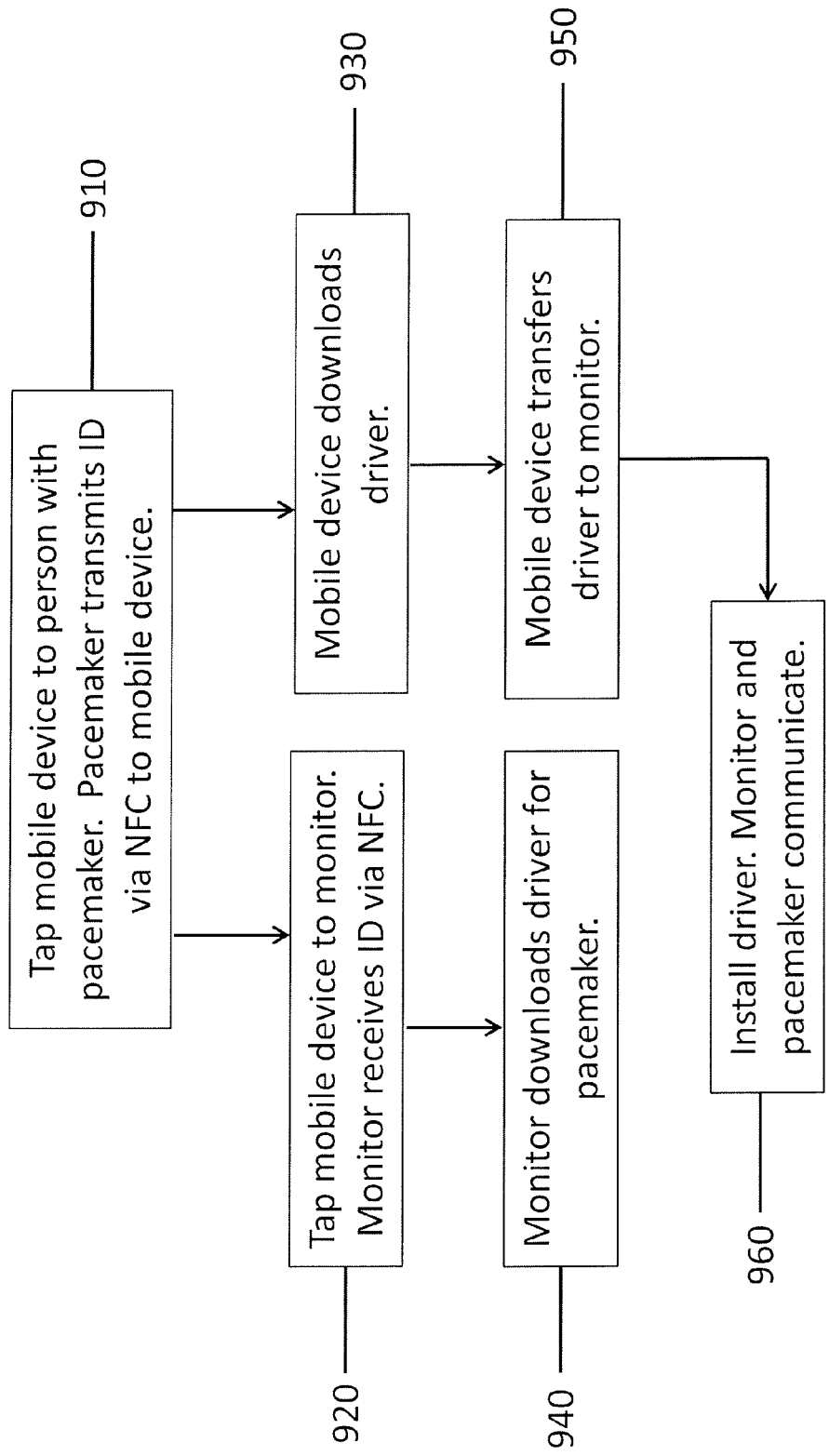
FIG. 9 is a flow chart diagram which provides an example of how a mobile device can be used in conjunction with a pacemaker, for example, to pair the pacemaker together with a monitor for the purpose of achieving pacemaker monitoring.

FIG. 9 provides another example of NFC based pairing. In this example, a pacemaker is paired to a monitor using mobile device 11. At step 910, mobile device 11 is placed into NFC communication proximity with a pacemaker, and the pacemaker transmits an ID (the "Interoperation Data") via, for example, NFC communication to mobile device 11. At step 920, when mobile device 11 is within NFC communication proximity, the monitor receives the ID by NFC communication. At step 940, the monitor uses the ID in order to download a driver (the "Interoperation Data") for communication with the pacemaker using any of several wireless technologies. At step 960, the monitor installs the driver and the monitor and pacemaker are able to communicate. Alternatively, when the mobile device receives the ID from the pacemaker, the mobile device downloads the driver and then the mobile device transfers the driver to the monitor. Again, once the driver has been installed in the monitor, the monitor and the pacemaker are able to communicate.

Figure 10:
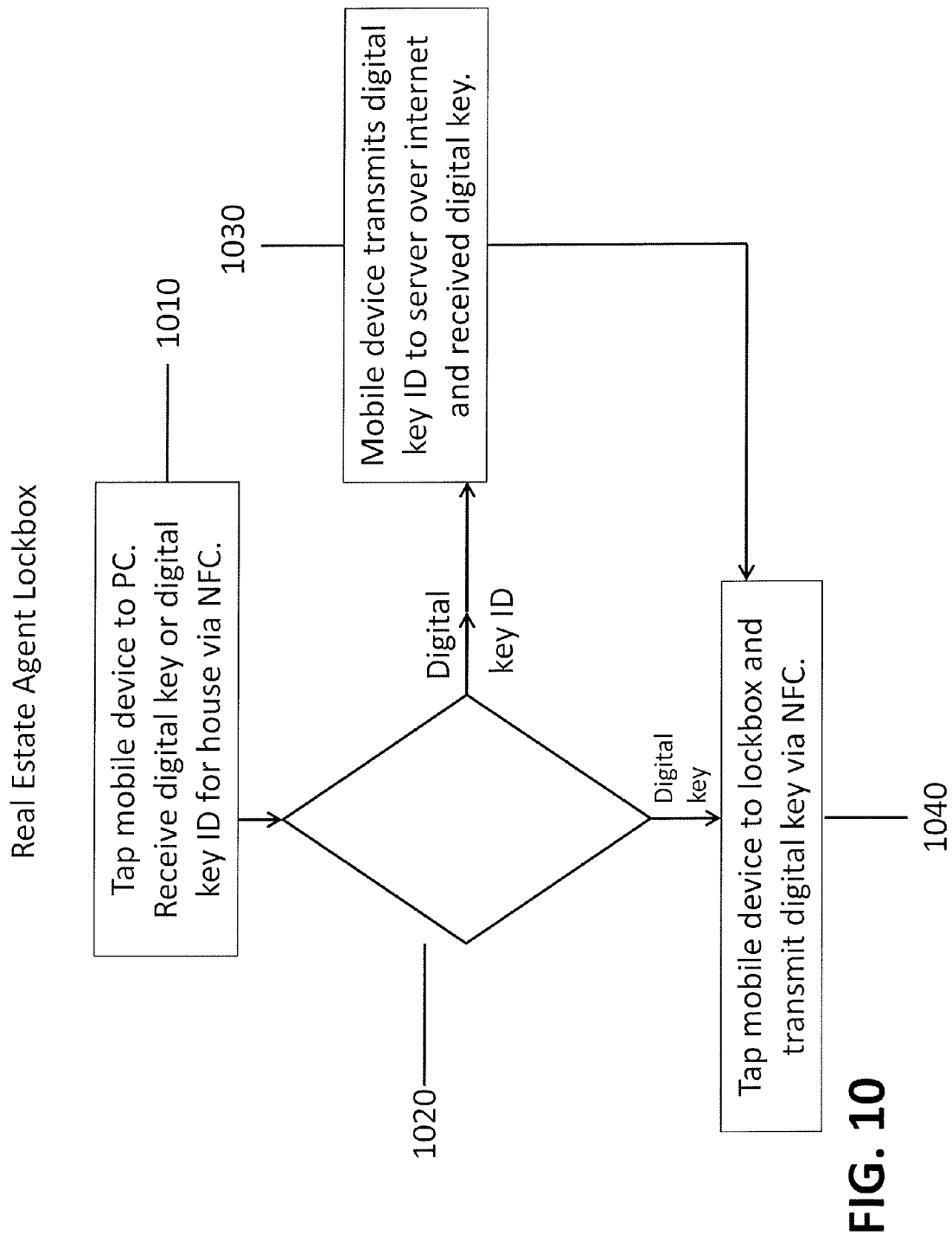
FIG. 10 is a flow chart diagram which provides an example of a real estate agent lock box which may be paired with a server in yet another example of pairing via NFC.

FIG. 10 provides yet another example of NFC based pairing. In FIG. 10, mobile device 11 communicates with device 1 (in this case a PC) in order to receive a digital key (the "Interoperation Data") or a digital key ID for a house. At step 1020, it is determined whether a digital key or a digital key ID has been received. If a digital key has been received, then at step 1040, the digital key is transmitted to device 2 (in this case a lockbox) via, for example, NFC so the lockbox may be opened and entry to a property secured by the lockbox is obtained. Alternately, if a digital key ID has been downloaded, then at step 1030, mobile device 11 uses the digital key ID to receive a digital key. Thus, for example, the digital key ID may be transmitted to a server and the server can return the digital key to the mobile device. As in the previous examples, various security protocols may be used, including the use of password protection, determining whether the mobile device 11 is authorized to receive the digital key, etc. After the digital key has been received at step 1030, access to the lockbox is obtained and the user is able to access the property. As device 1 (the PC) and device 2 (the lockbox) have been paired, device 2 can communicate with device 1 (over Wi-Fi, for example) and advise device 1 each time the lockbox has been opened with the key obtained from (or derived from) device 1.

In the specific examples discussed in detail above, the pairing involved an information flow that started at device 1 and resulted in delivery of pairing-related information to device 2. However, the same or similar technique may be used to provide information back to the first device, for example, if complete pairing of a particular set of devices requires that the first device obtain certain information from or about the second device.

Also, the information processing in the examples related to pairs of devices. In practice, however, the pairing techniques may be used to establish relationships with any number of devices. For instance, in a printer example, one printer may be shared by any number of computers, in which case any of the techniques discussed herein may be used to pair the one printer to each of the computers. For such an application, the applicable pairing procedure could be performed each time to pair the printer with each computer; or the mobile device could start the process by the appropriate interaction with the printer but then perform the appropriate interaction with the computers multiple times as needed (without going back to the printer each time).

For software functionality, programming, including executable code as well as associated stored data, (e.g. executable code and associated data files) may be used for applications running on the mobile device 11 for the host controller 112 and the NFC controller 136b. The software code is executable by the host controller 112 or the NFC controller 136b of the mobile device 11, although, at times, such software may be stored in another computer platform and downloaded through a network for installation in the mobile device 11. Execution of such code by a host controller of the mobile device 11 and/or the NFC controller 136b enables the mobile device 11 to implement the methodology for handling the various NFC communications, conducting the associated action(s) and possibly providing relevant user input/output via the user interface of the device 11, in essentially the manner performed in the implementations discussed and illustrated herein.

In the examples above, NFC communication is used between device 1 and mobile device 11, while various forms of communication (which may or may not include NFC) is used between mobile device 11 and device 2. It is understood, however, that NFC communication may be used between mobile device 11 and device 2, while various forms of communication (which may or may not include NFC) may be used between device 1 and mobile device 11.

Hence, aspects of the methods of NFC communication, and possibly other communications to/from a mobile device for pairing, and related action processing outlined above may be embodied in programming. Program aspects of the technology may be thought of as "products" or "articles of manufacture" typically in the form of executable code and/or associated data that is carried on or embodied in a type of machine readable medium.

The above examples have included device 1 and/or device 2 with NFC capability. However, it is understand that the invention is not necessarily limited to NFC capable devices. Thus, there may be other ways by which device 1 and/or device 2 may be communicate. Examples of other forms of communication include low powered protocols such as Bluetoothor Wifi, higher powered protocols such as cellular service, other wireless protocols, or wired protocols. Thus, NFC is merely an example of how communication between device 1 and/or device 2 may be performed.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 201, 102, or 211 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile device comprising:
   a transceiver for performing mobile wireless communication;
   a microprocessor for operating said mobile device;
   a near field communications (NFC) system for performing wireless communication independent of the transceiver and at a lower amount of power than the mobile wireless communication via said transceiver;
   a contactless front end included in said near field communications system for receiving or transmitting signals with an NFC capable device;
   a pairing system implemented by said microprocessor for pairing said NFC capable device with another device, wherein said pairing system configures the mobile device to:
   transmit, outside the mobile device, a tag corresponding to a device driver;
   receive interoperation data from one of said NFC capable device or said another device, wherein said interoperation data is associated with the device driver and the tag corresponding to the device driver for one of said NFC capable device or said another device, and further wherein the device driver corresponding to the tag is received from outside the mobile device; and
   transfer said interoperation data, including the device driver corresponding to the tag, to the other one of said another device or said NFC capable device after the device driver is identified as corresponding to the tag, in order to enable interoperation between said NFC capable device and said another device,
   wherein at least one of the receiving the interoperation data and the transferring of the interoperation data is via an NFC communication using the NFC system.

2. A mobile device according to claim 1, wherein both receiving interoperation data and transferring said interoperation data occurs via said NFC system.

3. A mobile device according to claim 1, wherein said pairing system further configures said mobile device to receive the device driver, from one of said NFC capable device or said another device via said NFC system and to transfer said device driver to one of said another device or said NFC capable device via said NFC system.

4. A mobile device according to claim 1, wherein said pairing system further configures said mobile device to receive said tag corresponding to the device driver, from one of said NFC capable device or said another device via said NFC system, and to transfer said tag to one of said another device or said NFC capable device via said NFC system.

5. A method of pairing a near field communications (NFC) capable device with another device, said method comprising:
   transmitting, outside a mobile device, a tag corresponding to a device driver;
   receiving interoperation data from one of said NFC capable device or said another device, wherein said interoperation data is associated with the device driver and the tag corresponding to the device driver for one of said NFC capable device or said another device, and further wherein the device driver corresponding to the tag is received from outside the mobile device; and
   transferring said interoperation data, including the device driver corresponding to the tag, to the other one of said another device or said NFC capable device after said device driver is identified as corresponding to said tag, in order to enable interoperation between said NFC capable device and said another device, wherein at least one of the first and second communications is an NFC communication.

6. A method of pairing an NFC capable device with another device according to claim 5, wherein:
   receiving the device driver from one of said NFC capable device or said another device via NFC communication; and
   transferring said device driver to one of said another device or said NFC capable device via NFC communication.

7. A method of pairing an NFC capable device with another device according to claim 5, further comprising:
   receiving the tag which corresponds to the device driver from one of said NFC capable device or said another device via said NFC communication; and
   transferring said tag to one of said another device or said NFC capable device via NFC communication.

8. A non-transitory machine-readable medium comprising instructions stored therein, which when executed by a machine, causes the machine to perform functions, comprising functions to:
   transmit, outside a mobile device, a tag corresponding to a device driver;
   receive interoperation data from one of an NFC capable device or another device, wherein said interoperation data is associated with the device driver and the tag corresponding to the device driver for one of said NFC capable device or said another device, and further wherein the device driver corresponding to the tag is received from outside the mobile device; and
   transfer said interoperation data, including the device driver corresponding to the tag, to the other one of said another device or said NFC capable device after the device driver is identified as corresponding to the tag, in order to enable interoperation between said NFC capable device and said another device, wherein at least one of the receiving the interoperation data and the transferring of the interoperation data is via an NFC communication using an NFC system.

9. A non-transitory machine-readable medium according to claim 8, wherein the instructions cause the machine to: both receive said interoperation data from said NFC capable device and transfer said interoperation data to one of said another device or said NFC capable device occurs via NFC communication.

10. A non-transitory machine-readable medium according to claim 9, wherein the instructions cause the machine to: receive the device driver from one of said NFC capable device via said NFC communication or said another device and transfer said device driver to one of said another device or said NFC capable device via said NFC communication.

11. A non-transitory machine-readable medium according to claim 9, wherein the instructions further configure the machine to: receive the tag corresponding to the device driver, from one of said NFC capable device via said NFC communication or said another device, and transfer the tag to one of said another device or said NFC capable device via said NFC communication.

\* \* \* \* \*